(12) United States Patent
Shimizu (10) Patent No.: US 12,268,132 B2
(45) Date of Patent: Apr. 8, 2025

(54) RECIPROCATING CUTTING BLADE APPARATUS AND BRUSH CUTTER

(71) Applicant: YAMABIKO CORPORATION, Tokyo (JP)

(72) Inventor: Kunio Shimizu, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 506 days.

(21) Appl. No.: 17/587,081

(22) Filed: Jan. 28, 2022

(65) Prior Publication Data

US 2022/0151159 A1 May 19, 2022

Related U.S. Application Data

(63) Continuation of application No. PCT/JP2020/020758, filed on May 26, 2020.

(30) Foreign Application Priority Data

Aug. 8, 2019 (JP) ................................ 2019-146470

(51) Int. Cl.
*A01G 3/053* (2006.01)

(52) U.S. Cl.
CPC .................... *A01G 3/053* (2013.01)

(58) Field of Classification Search
CPC ........ A01G 3/04; A01G 3/047; A01G 3/0475; A01G 3/053; A01G 2003/0461;
(Continued)

(56) References Cited

U.S. PATENT DOCUMENTS 5,402,576 A * 4/1995 Kiyooka ................ A01D 34/63
30/216
5,666,730 A * 9/1997 Aiyama ................ A01G 3/053
30/220
(Continued)

FOREIGN PATENT DOCUMENTS

EP 2570017 A1 3/2013
JP S51-18254 U 2/1976
(Continued)

OTHER PUBLICATIONS

International Search Report cited in International Appln. No. PCT/JP2020/02758 filed on May 26, 2020.
(Continued)

*Primary Examiner* — Jason Daniel Prone
(74) *Attorney, Agent, or Firm* — BACON&THOMAS,PLLC (57) ABSTRACT

A reciprocating cutting blade apparatus includes: a pair of reciprocating cutting blades disposed to overlap one another in a thickness direction; an upper support member and a lower support member sandwiching and reciprocably supporting the reciprocating cutting blades; and a transmission case to which the upper and lower support members maintaining a distance therebetween are mounted. The transmission case includes: a grease inlet and an upper grease reservoir provided above the upper support member accumulating grease poured from the grease inlet and; a lower Grease reservoir provided below the lower support member and accumulating the grease poured from the grease inlet. The upper support member includes a through-hole communicating with the upper grease reservoir. The lower support member includes a through-hole communicating with the lower grease reservoir. The reciprocating cutting blades includes through-holes allowing communication
(Continued)

between the through-holes of the upper support member and the lower support member, respectively.

6 Claims, 5 Drawing Sheets

(58) Field of Classification Search
CPC ...... A01D 34/13; A01D 34/14; A01D 34/145; A01D 34/38
USPC .................................. 30/208–210, 215–222
See application file for complete search history.

(56) References Cited

U.S. PATENT DOCUMENTS

| | | | | |
|---|---|---|---|---|
| 5,987,753 | A * | 11/1999 | Nagashima | A01G 3/053 30/216 |
| 6,170,159 | B1 * | 1/2001 | Kramer | A01G 3/053 30/216 |
| 6,263,579 | B1 * | 7/2001 | Nagashima | A01G 3/053 30/220 |
| 7,406,770 | B2 * | 8/2008 | Mace | A01D 34/14 30/220 |
| 7,788,811 | B2 * | 9/2010 | Hanada | A01G 3/053 30/210 |
| 8,028,423 | B2 * | 10/2011 | Matsuo | A01G 3/053 30/220 |
| 8,959,780 | B2 * | 2/2015 | Masalin | A01G 3/053 30/208 |
| 9,610,700 | B2 * | 4/2017 | Hittmann | A01G 3/053 |
| 9,675,011 | B2 * | 6/2017 | Sergyeyenko | A01G 3/053 |
| 9,736,991 | B2 * | 8/2017 | Hanada | A01G 3/053 |
| 10,321,636 | B2 * | 6/2019 | Peterson | A01G 3/053 |
| 10,569,408 | B2 * | 2/2020 | Shimizu | A01G 3/053 |
| 11,272,671 | B2 * | 3/2022 | Shimizu | A01G 3/053 |
| 11,432,467 | B2 * | 9/2022 | Shimizu | A01G 3/0475 |
| 11,432,468 | B2 * | 9/2022 | Shimizu | A01G 3/053 |
| 11,648,656 | B2 * | 5/2023 | Shimizu | A01G 3/053 173/217 |
| 2010/0037469 | A1 * | 2/2010 | Chubb | A01G 3/053 30/216 |
| 2014/0230398 | A1 | 8/2014 | Cook et al. | |
| 2019/0357445 | A1 * | 11/2019 | McCue | A01G 3/053 |
| 2020/0045889 | A1 * | 2/2020 | Shimizu | A01G 3/053 |
| 2022/0078977 | A1 * | 3/2022 | Shimizu | A01G 3/053 |
| 2022/0400618 | A9 * | 12/2022 | Shimizu | A01G 3/04 |

FOREIGN PATENT DOCUMENTS

| | | |
|---|---|---|
| JP | S55-41085 U | 3/1980 |
| JP | H04-117546 U | 10/1992 |
| JP | H04-133153 U | 12/1992 |
| JP | H063025 U | 1/1994 |
| JP | 2012-29594 A | 2/2012 |
| JP | 2016-49082 A | 4/2016 |

OTHER PUBLICATIONS

First Office Action and English Translation cited in corresponding International Appln. No. 202080054051.6.
English Translation of the Written Opinion of the ISA (PCT/ISA/237).
English Translation of ISR (PCT/ISA/210 second sheet).

* cited by examiner

RECIPROCATING CUTTING BLADE APPARATUS AND BRUSH CUTTER

CROSS-REFERENCE TO RELATED APPLICATIONS

The present application is a continuation application of PCT International Application No. PCT/JP2020/20758 filed on May 26, 2020 and claims priority from Japanese Patent Application No. 2019-146470 filed on Aug. 8, 2019, and the entire contents of which are hereby incorporated by reference.

BACKGROUND

1. Technical Field

The present invention relates to a reciprocating cutting blade apparatus and a blush cutter.

2. Related Art

There has been generally known a trimer such as a hedge trimmer for cutting or clipping branches and leaves, which is equipped with a reciprocating cutting blade apparatus having reciprocating cutting blades, like a hair clipper (see Japanese Utility Model Application Laid-Open No. H04-117546). The entire contents of the disclosure are hereby incorporated by reference.

Here, a reciprocating cutting blade has an advantage over a rotary cutter or a nylon cutter used in a common brush cutter in that it produces little scattering substances during the work. Therefore, there has been proposed a brush cutter with this advantage of the reciprocating cutting blade, which is equipped with a reciprocating cutting blade apparatus mounted to the top end of a handheld operating rod to perform mowing on the ground (see Japanese Patent Application Laid-Open No. 2016-49082). The entire contents of the disclosure are hereby incorporated by reference.

The above-described reciprocating cutting blades includes two cutters each of which includes a base like a flat plate extending in the longitudinal direction and a plurality of teeth protruding from the base in a direction intersecting the longitudinal direction. These two cutters overlap one another in the thickness direction to constitute a pair of reciprocating cutting blades. Then, the pair of reciprocating cutting blades slides on a contact surface and reciprocates in the longitudinal direction to apply cutting action to an object sandwiched between the teeth of one cutter and those of the other cutter.

The gap between the two cutters significantly affects the cutting performance (sharpness) of the reciprocating cutting blades. In order to keep the sharpness of the cutting blades in a good condition, the width of the gap between the two cutters needs to be correctly adjusted. In this case, when foreign substances enter the gap between the two cutters, the cutters cannot smoothly move, and therefore through-holes to fill the gap with a lubricant are provided in the cutters and the support members supporting the cutters (see Japanese Utility Model Application Laid-Open No. H04-117546).

SUMMARY

According to an aspect of the invention, a reciprocating cutting blade apparatus includes: a pair of reciprocating cutting blades disposed co overlap one another in a thickness direction; an upper support member and a lower support member configured to sandwich and reciprocably support the pair of reciprocating cutting blades; and a transmission case to which the upper support member and the lower support member maintaining a distance therebetween are mounted. The transmission case includes: a grease inlet and an upper grease reservoir provided above the upper support member, the upper grease reservoir being configured to accumulate grease poured from the grease inlet and; a lower grease reservoir provided below the lower support member and configured to accumulate the grease poured from the grease inlet. The upper support member includes a through-hole configured to communicate with the upper grease reservoir. The lower support member includes a through-hole configured to communicate with the lower grease reservoir. The pair of reciprocating cutting blades includes through-holes configured to allow communication between the through-hole of the upper support member and the through-hole of the lower support member, respectively.

DETAILED DESCRIPTION

The reciprocating cutting blades of the reciprocating cutting blade apparatus are supported by a transmission case via support members. Accordingly, the transmission case is structured to have Gaps needed to smoothly reciprocate the cutting blades in places at which the cutting blades are supported, and therefore tends to allow foreign substances and water to enter from the gaps. In particular, when the reciprocating cutting blade apparatus is used as a brush cutter, the cutting blades approach the ground during the work, and therefore a lot of foreign substances and water enter the transmission case from the lower side of the cutting blades. This causes a problem of reducing the durability of a power train, or the durability of the coupling portions at which power train is coupled with the cutting blades.

In addition, in order to improve the efficiency of the maintenance of the cutting blades, it is preferred that the reciprocating cutting blade apparatus is structured to allow two cutting blades to be attached, detached or replaced while the cutting blades are sandwiched between the upper and lower support members and the distance between the upper and lower support members is maintained. However, this structure causes foreign substances to easily enter into the transmission case from between the lower support member and the lower cutting blade, and then the foreign substances having entered into the gap between the support member and the cutting blade may hinder the cutting blades from smoothly reciprocating. This problem tends to occur, in particular, when brush cutting is performed by using the reciprocating cutting blade apparatus.

In addition, when the two cutting blades are removably supported between the upper and lower support members, a structure to removably couple reciprocating members of the power train to the cutting blades is adopted in this case, coupling parts of the reciprocating members and the cutting blades tend to be worn by repeatedly reciprocating the cutting blades, and therefore to address this wear problem, there is a demand to effectively supply the coupling parts with lubricant.

The present invention is proposed to address the above-described problem, and it is therefore an object of the invention to provide a reciprocating cutting blade apparatus capable of: preventing foreign substances and water from entering the transmission case; smoothly reciprocating the cutting blades while improving the efficiency of the maintenance of the cutting blades; and preventing the coupling parts of the power train and the cutting blades from being worn out by effectively supplying the coupling parts with a lubricant.

Hereinafter, an embodiment of the present invention will be described with reference to the drawings. The same reference numbers in the different drawings indicate the same functional parts, and therefore repeated description for each of the drawings is omitted. Here, a reciprocating cutting blade apparatus according to an embodiment will be described as an example, but this is by no means limiting.

Figure 1:
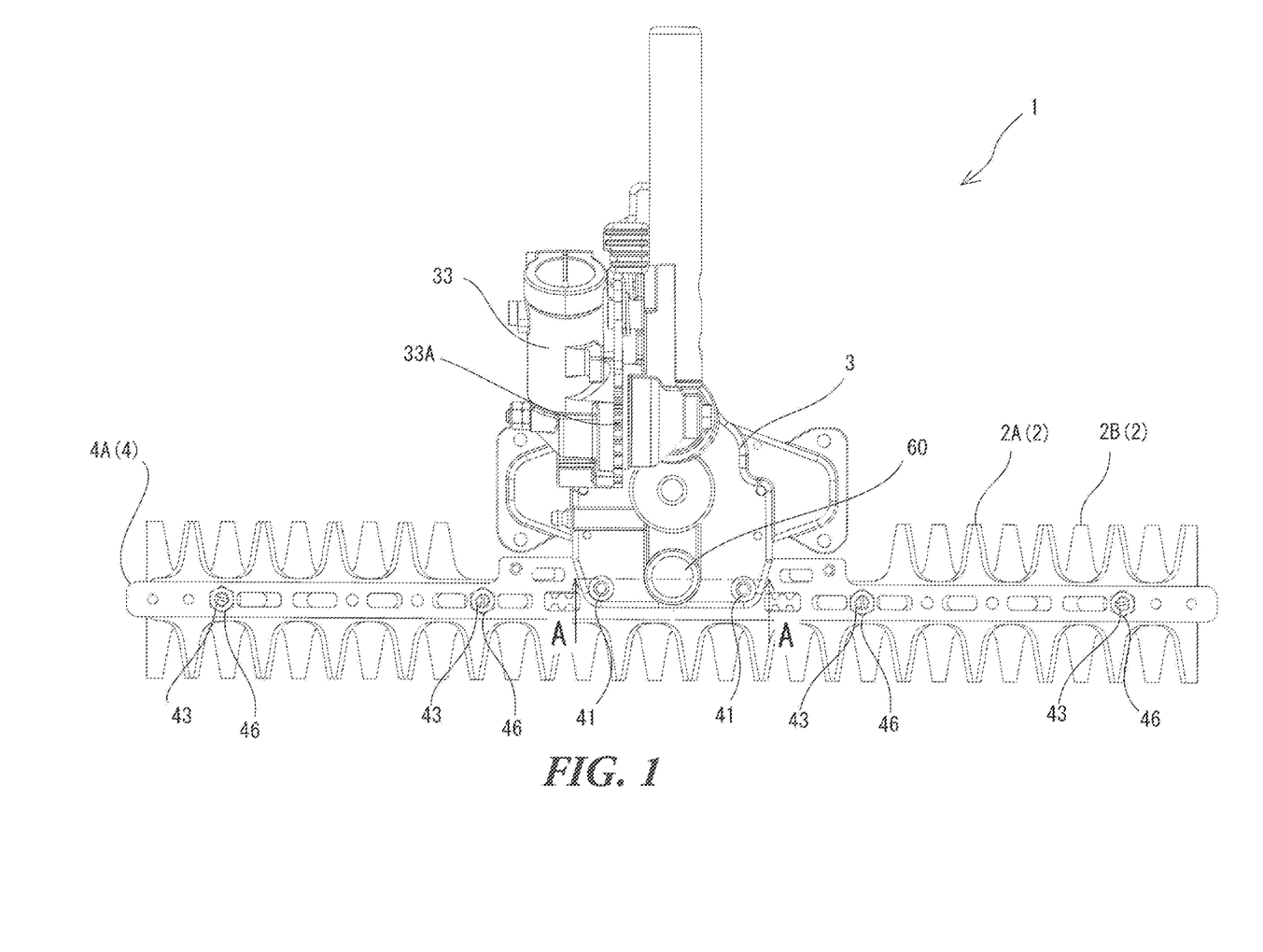
FIG. 1 is a plan view it a reciprocating cutting blade apparatus according to an embodiment of the invention.
Figure 2:
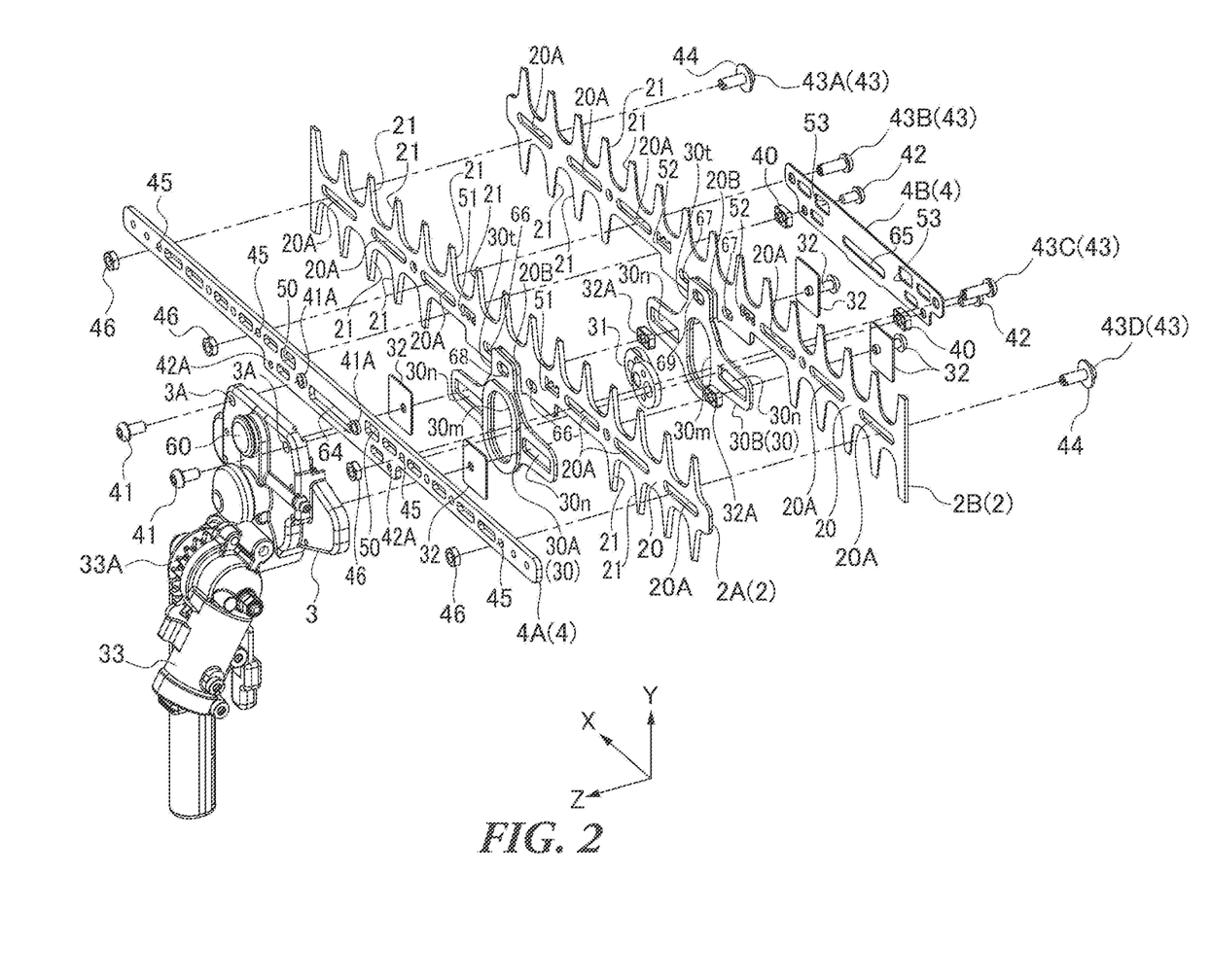
FIG. 2 is an exploded perspective view illustrating the reciprocating cutting blade apparatus according to an embodiment of the invention.

As illustrated in FIGS. 1 and 2, a reciprocating cutting blade apparatus 1 includes a pair of reciprocating cutting blades (hereinafter, simply referred to as "cutting blades") 2, a transmission case 3, and a cutting blade support member 4, and is configured to cut plants, brush, and so forth by sliding the cutting blades 2 one another.

The cutting blades 2 include two cutters 2A and 2E which are made of metallic plates and overlap one another in the thickness direction (Z direction in the drawing). Each of the cutters 2A and 2B of the cutting blades 2 includes a base 20 like a flat plate extending in the longitudinal direction (X direction in the drawing) and a plurality of teeth 21 protruding in the direction (Y direction in the drawing) intersecting the longitudinal direction.

The bases 20 of the cutters 2A and 2B are supported by the cutting blade support member 4 including an upper support member 4A and a lower support member 4B. A plurality of elongate holes 20A through which joint members (adjustment screws described later) penetrate are provided in each of the bases 20 in the longitudinal direction of the cutting blades 2 (the X direction). These elongate holes 20A define the movement direction in which the cutting blades 2 reciprocate.

The teeth 21 may be provided on both sides of the cutters 2A and 2B as illustrated, or one side in the Y direction. These teeth 21 are like comb-like cutters of a hair clipper. The two cutters 2A and 2B slide relative to one another in the longitudinal direction to apply cutting action to the plants and so forth between the teeth 21 of the cutter 2A and those of the cutter 2B.

The transmission case 3 includes a power train to reciprocate the cutting blades 2. The power train is configured to convert the rotation of a drive shaft (not illustrated) to reciprocating motion, and includes reciprocating members (connecting rods) 30 (30A and 30B) which are reciprocably supported in the longitudinal direction of the cutting blades 2 (the X direction), and an eccentric cam 31.

As illustrated in FIG. 2, the reciprocating members 30 (30A and 30B) include coupling parts 30t formed at their top ends and configured to be coupled with the bases 20 of the cutting blades 2A and 2B, respectively. Each of the coupling parts 30t includes a convex portion protruding in the direction (the Y direction) orthogonal to the longitudinal direction of the cutting blades 2. Meanwhile, a concave portion 20B is formed in a coupled portion of the base 20 with which the above-described coupling part 30t (convex portion) is coupled, and the coupling part 30t is removably engaged with the concave portion 20B.

Each of the reciprocating members 30 (30A, 30B) includes a fitting hole 30m in which the eccentric cam 31 is fitted, and guide holes 30n. Guide members 32A are fixed to the transmission case 3 via support members 32, and the guide holes 30n of the reciprocating members 30 are engaged with the guide members 32A. The guide holes 30n are provided on the right and left sides of the fitting hole 30m along the X direction.

The cutting blade support member 4 is attached to the transmission case 3, and configured to sandwich the bases 20 of the pair of cutting blades 2A and 2B therebetween and support the cutting blades 2 to be able to move in the longitudinal direction (the X direction). With the example illustrated, the cutting blade support member 4 includes a pair of support members (upper support member 4A and lower support member 4B) extending in the longitudinal direction of the cutting blades 2 (the X direction).

The upper support member 4A and the lower support member 4B of the cutting blade support member 4 are joined via spacers 40 to make a space to accommodate the pair of cutting blades 2. The upper support member 4A and the lower support member 4B are individually attached to the transmission case 3 while keeping the space. The pair of cutting blades 2 is accommodated in the space and detachably attached to the cutting blade support member 4.

A joint and support structure of the cutting blades 2 and the cutting blade support member 4 will be described. First, attachment screws 41 are screwed into screw holes 41A of the upper support member 4A via holes 3A of the transmission case 3 to independently attach the upper support member 4A of the cutting blade support member 4 to the transmission case 3. Meanwhile, the upper support member 4A and the lower support member 4B are joined to one another by joint screws 42 at joint points 42A without interfering with the pair of cutting blades 2. The joint screws 42 penetrate the holes of the lower support member 4B and the spacers 40, and are screwed into the joint points 42A of the upper support member 4A. By this means, the upper support member 4A and the lower support member 4B are joined while keeping the space for the thickness of the spacers 40, and attached to the transmission case 3. In this case, the upper support member 4A and the lower support member 4B are combined with one another by the joint screws 42 via the spacers 40, and the joined portions serve as joints of bamboo. By this means, it is possible to improve the rigidity of the cutting blades 2 and the cutting blade support member 4 while reducing the weight.

The pair of cutting blades 2 (cutters 2A and 2B) sandwiched between the upper support member 4A and the lower support member 4B is reciprocably supported by the cutting blade support member 4 with adjustment screws 43 (43A, 43B, 43C and 43D) at points different from the above-described joint points 42A. Here, the two adjustment screws 43A and 431 of the four adjustment screws 43 are inserted into washers 44, and screwed into screw holes 45 of the upper support member 4A via the elongate holes 20A of the pair of cutting blades 2, and fixed by fixing nuts 46. In addition, the other two adjustment screws 43B and 43C are inserted into the holes of the lower support member 4B, and screwed into the screw holes 45 of the upper support member 4A via the elongate holes 20A of the pair of cutting blades 2, and fixed by the fixing nuts 46.

In this case, the distance between the washers 44 and the upper support member 4A is adjusted by the adjustment screws 43A and 43D, and therefore it is possible to adjust the gap between the two cutters 2A and 2B sandwiched between the washers 44 and the upper support member 4A. In addition, the distance between the upper support member 4A and the lower support member 4B is adjusted by the adjustment screws 43B and 43D, and therefore it is possible to adjust the gap between the two cutters 2A and 2B sandwiched between the upper support member 4A and the lower support member 4B.

The cutting blades 2 are coupled with the power train in the transmission case 3 simply by coupling the coupling parts 30t formed at the top ends of the reciprocating members 30 with the bases 20 of the cutting blades 2, and engaging the convex portions of the coupling parts 30t with the concave portions 20B of the bases 20 which are concave in the direction to match the convex portions. Therefore, it is possible to easily detach the pair of cutting blades 2 from the transmission case 3 and the cutting blade support member 4 by pulling out the cutting blades 2.

Here, in a case where the concave portion 20B is provided near the center of each of the bases 20 in the longitudinal direction, the concave portion 20B can be easily engaged with the coupling part 30t (the convex portion) of the reciprocating member 30 simply by aligning approximately the center of the base 20 with approximately the center of the cutting blade support member 4. By this means, it is possible to readily couple the cutting blades 2 with the power train. Meanwhile, even in a case where the concave portion 20B is not provided near the center of the base 20, the coupling part 30t of the reciprocating member 30 can be visually recognized between the upper support member 4A and the lower support member 4B, and therefore it is possible to easily engage the coupling part 30t with the concave portion 20B of the base 20, looking at the convex portion of the coupling part 30t.

In addition, in a case where the pair of cutting blades 2 is detached from the cutting blade support member 4, when the coupling parts 30t of the reciprocating members 30 engaged with the concave portions 20B of the pair of cutting blades 2 overlap one another, it is easy not only to detach the cutting blades 2 but also to attach the cutting blades 2. However, in a case where the cutting blades 2 are stopped moving, the cutters 2A and 2B may be in positions in which they are reciprocating, and therefore the concave portions 20B of the cutters 2A and 2B usually are not aligned with one another, and also the coupling parts 30t are not aligned with one another.

Therefore, alignment holes 50 of the upper support member 4A, alignment holes 51 of the cutter 2A, alignment holes 52 of the cutter 2B, and alignment holes 53 of the lower support member 4B are provided to correct the misalignment of the cutters 2A and 2B when the cutting blades 2 are stopped. After the cutting blades 2 are stopped, the alignment is performed by inserting a tool such as a flat-blade screwdriver into the alignment holes 50 to 53. By this means, it is possible to correct the misalignment of the concave portions 20B of the cutters 2A and 2B before the cutting blades 2 are detached from the cutting blade support member 4, and consequently to overlap the coupling parts 30t engaged with the concave portions 20B one another. This alignment makes it easy to attach the cutting blade support member 4 to the cutting blade support member 4, and also detach the cutting blades 2 from the cutting blade support member 4. In this case, in order to check the alignment, a plurality of holes are formed in the upper support member 4A and the cutters 2A and 2B, which overlap each other when the alignment is successfully done.

Figure 3:
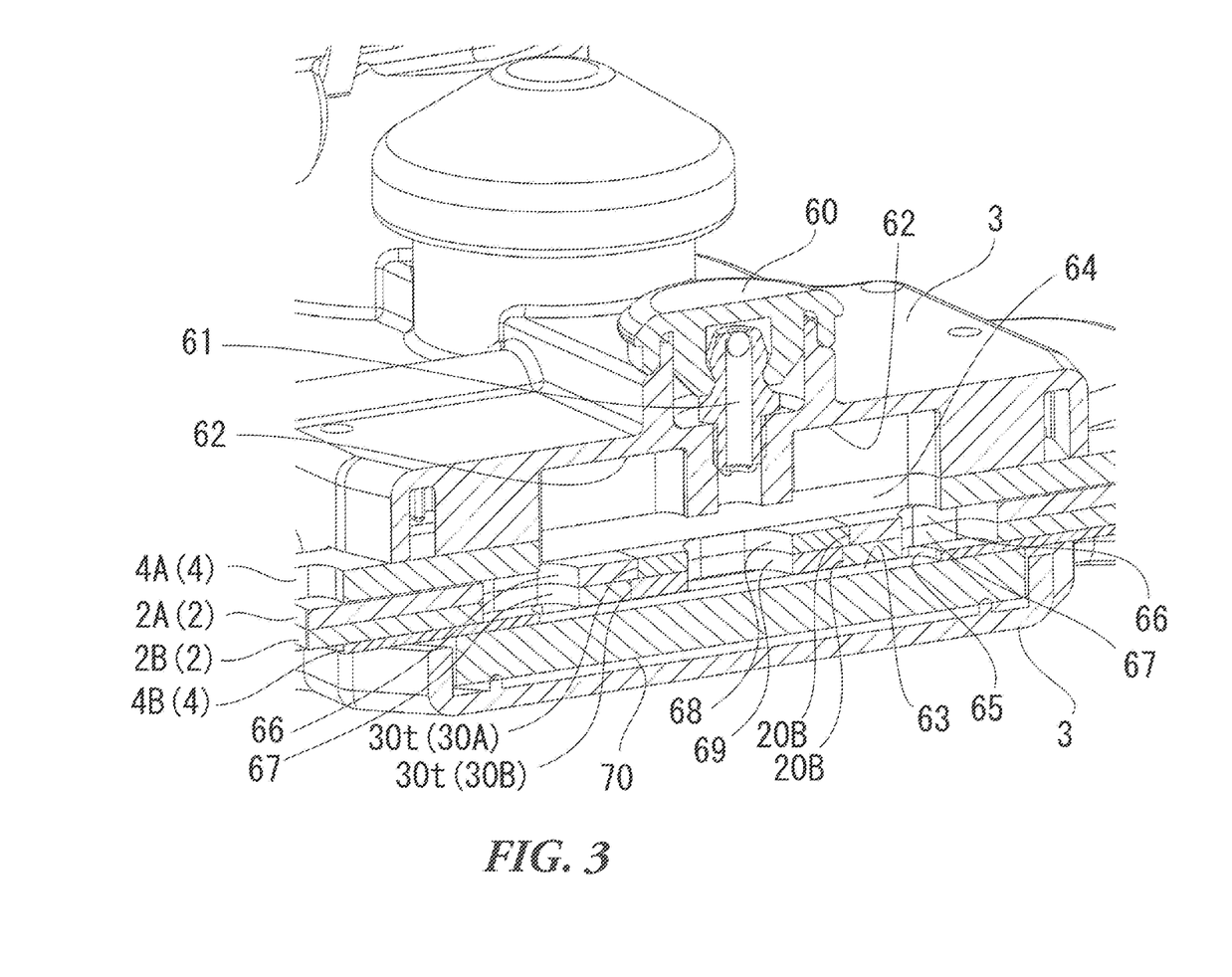
FIG. 3 is a cross-sectional view taken along line A-A of FIG. 1 (Embodiment 1)

As illustrated in FIG. 3, the transmission case 3 includes a grease inlet 61 and upper grease reservoirs 62 provided above the upper support member 4A, and a lower grease reservoir 63 provided below the lower support member 4B. The upper grease reservoirs 62 and the lower grease reservoir 63 are configured to accumulate the grease poured from the grease inlet 61. In addition, a through-hole 64 configured to communicate with the upper grease reservoirs 62 is formed in the upper support member 4A, and a through-hole 65 configured to communicate with the lower grease reservoir 63 is formed in the lower support member 4B. Moreover, through-holes 66 and 67 configured to allow communication between the through-hole 64 of the upper support member 4A and the through-hole 65 of the lower support member 4B are formed in the pair of cutting blades 2, respectively.

With the example illustrated, the grease inlet 61 is provided in the center of the transmission case 3 in the right and left direction, and covered with an inlet cover 60. The upper grease reservoirs 62 are provided on the right and left sides of the grease inlet. 61, and formed as spaces which are concave upward and configured to communicate with the grease inlet 61. In addition, the through-hole 64 is formed in the upper support member 4A under the right and left upper grease reservoirs 62. The through-hole 64 is horizontally long from side to side and configured to communicate with the right and left upper grease reservoirs 62.

The lower grease reservoir 63 is provided on a packing 70 contacting the lower support member 4B, and surrounded by the horizontally long trough-hole 65 formed in the lower support member 4B.

The pair of reciprocating members 30 (30A and 30B) of the power train in the transmission case includes through-holes 68 and 69 configured to allow communication between the through-hole 64 of the upper support member 4A and the through-hole 65 of the lower support member 4B, respectively. The through-holes 68 and 69 of the pair of reciprocating members 30 (30A and 30B) are provided in the coup inc parts 30t engaged with the concave portions 20B of the cutting blades 2 and located below the grease inlet 61. By this means, the through-holes 68 and 69 formed in the pair of reciprocating members 30 (30A and 30B) are located in the concave portions 20B of the cutting blades 2.

In order to pour the grease from the grease inlet 61 into the transmission case 3, first, the cutting blades 2 are aligned by using the alignment holes 50 to 53. By this means, as illustrated in. FIG. 3, the through-holes 68 and 69 of the pair of reciprocating members 30 (30A and 30B) overlap one another, the through-holes 66 and 67 of the cutting blades 2 overlap one another, and consequently the these through-holes 66 to 69 overlap the through-hole 64 of the upper support member 4A and the through-hole 65 of the lower support member 4B.

In this state, when the inlet cover 60 is removed and the grease is poured from the grease inlet 61, the pored grease passes through the through-holes 64, 66, 67, 68 and 69 and fills the horizontally long through-hole 65 of the lower support member 4B. By this means, the lower grease reservoir 63 on the packing 70 is filled with the grease. In addition, when the grease is further poured from the grease inlet 61, the through-holes 66 to 69 are filled with the grease, and also the through-hole 64 of the upper support member 4A and the upper grease reservoirs 62 are filled with the grease.

Then, in this state where the grease is filled, when the inlet cover 60 is attached to the grease inlet. 61 and the cutting blades 2 are reciprocated, the grease is spread over the upper surfaces and the lower surfaces of the cutters 2A and 2B, and also between the cutters 2A and 2B to form an oil film. By this means, the oil film of grease is formed on the upper and lower surfaces of the pair of reciprocating members 30 (30A and 30B) coupled with the cutting blades 2 and between the pair of reciprocating members 30 (30A and 30B), while the oil film of grease is formed on the coupling portions of the cutting blades 2 and the pair of reciprocating members 30 (the portions at which the coupling parts 30t are engaged with the concave portions 20B). Moreover, the oil film of grease is formed between the cutter 2A and the upper support member 4A and also between the cutter 2B and the lower support member 4B.

Figure 4:
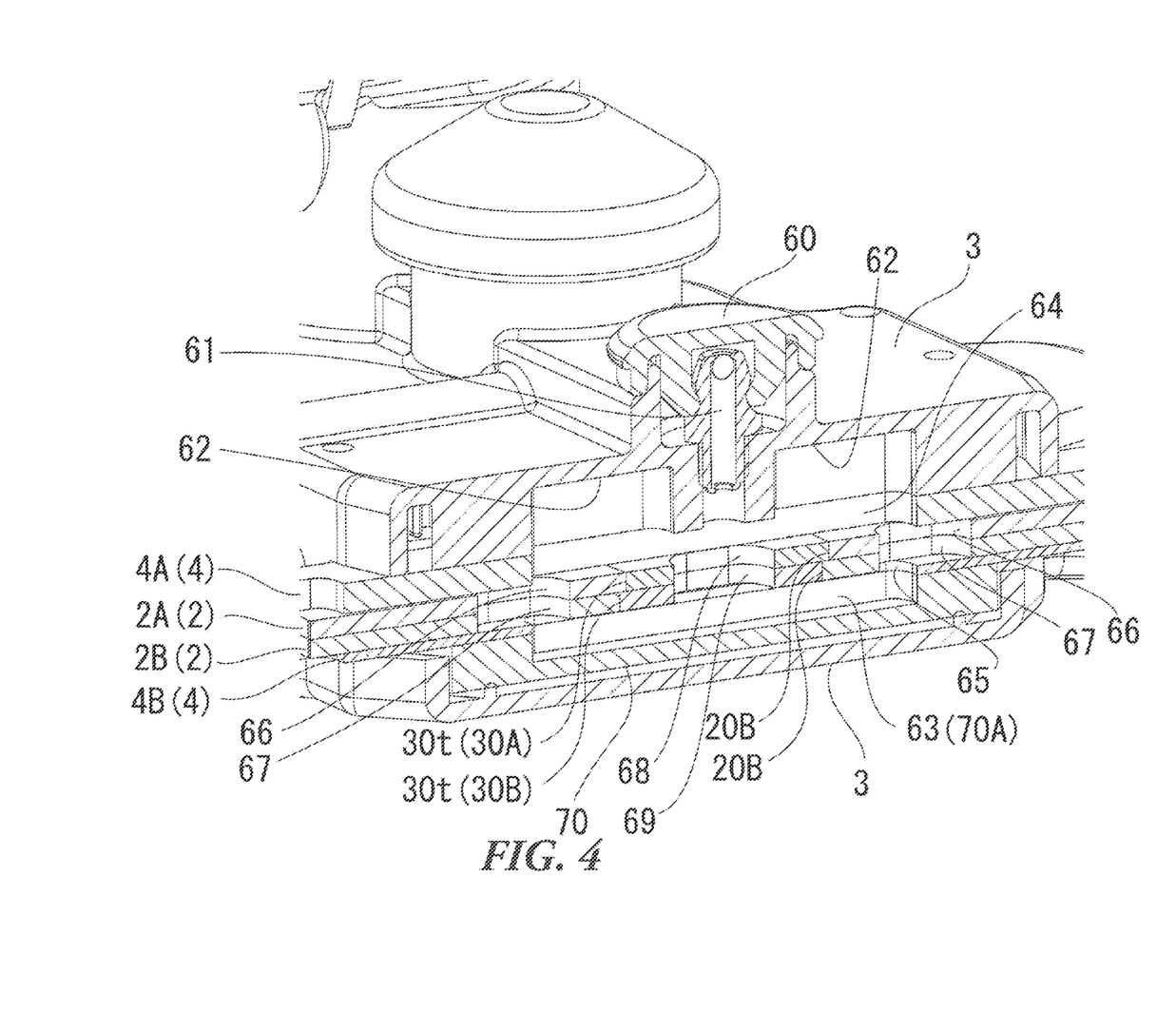
FIG. 4 is a cross-sectional view taken along line A-A of FIG. 1 (Embodiment 2)

FIG. 4 is a modification of the example illustrated in FIG. 3. With this modification, the packing 70 includes a concave portion 70A, and the lower grease reservoir 63 is provided in the concave portion 70A. Other components are the same as those of the example illustrated in FIG. 3. In this way, the lower grease reservoir 63 is provided in the concave portion 70A, and therefore it is possible to supply more grease to the lower side of the cutting blades 2.

The reciprocating cutting blade apparatus 1 having this grease filling structure can fill all the gaps which are needed to mount the cutting blades 2 to the transmission case 3 and reciprocate the cutting blades 2 with the grease. By this means, it is possible to prevent foreign substances and water drops from entering the transmission case 3. In particular, the packing 70 is provided under the lower support member 4B supporting the lower side of the cutting blades 2, and the lower grease reservoir 63 is provided on the packing 70. Therefore, it is possible to effectively block foreign substances being about to enter the transmission case 3 from the lower side of the cutting blades 2. By this means, during the brush cutting where the cutting blades 2 approach the ground, it is possible to prevent foreign substances and water from entering the transmission case 3.

In addition, with this grease filling structure, also the oil film of grease is formed on the coupling portions of the cutting blades 2 and the pair of reciprocating members 30 (the portions at which the coupling parts 30t are engaged with the concave portions 20B). Therefore, it is possible to suppress the wear of the coupling portions of the cutting blades 2 and the reciprocating members 30. By this means, it is possible to improve the durability of the cutting blades 2 and the power train.

In addition, in a case where the cutting blades 2 can be replaced while the cutting blade support member 4 is mounted to the transmission case 3, or in a case where an assembly of the cutting blades 2 and the cutting blade support member 4 (the upper support member 4A and the lower support member 4B) can replaced for the transmission case 3, by providing the replaced cutting blades 2 and cutting blade support member 4 with the through-holes 64, 65, 66, and 67 in the same way, it is possible to easily fill all the paps which are needed to mount the cutting blades 2 to the transmission case 3 and reciprocate the cutting blades 2 with the grease.

Moreover, the oil film of grease is formed over all the parts on which the reciprocating cutting blades 2 contact and slide. By this means, it is possible to reduce the sliding resistance, and therefore to prevent the consumption of an extra driving force and improve the durability. Furthermore, it is possible to suppress the vibration and the noise by suppressing metallic clank due to contact between the metals.

Figure 5:
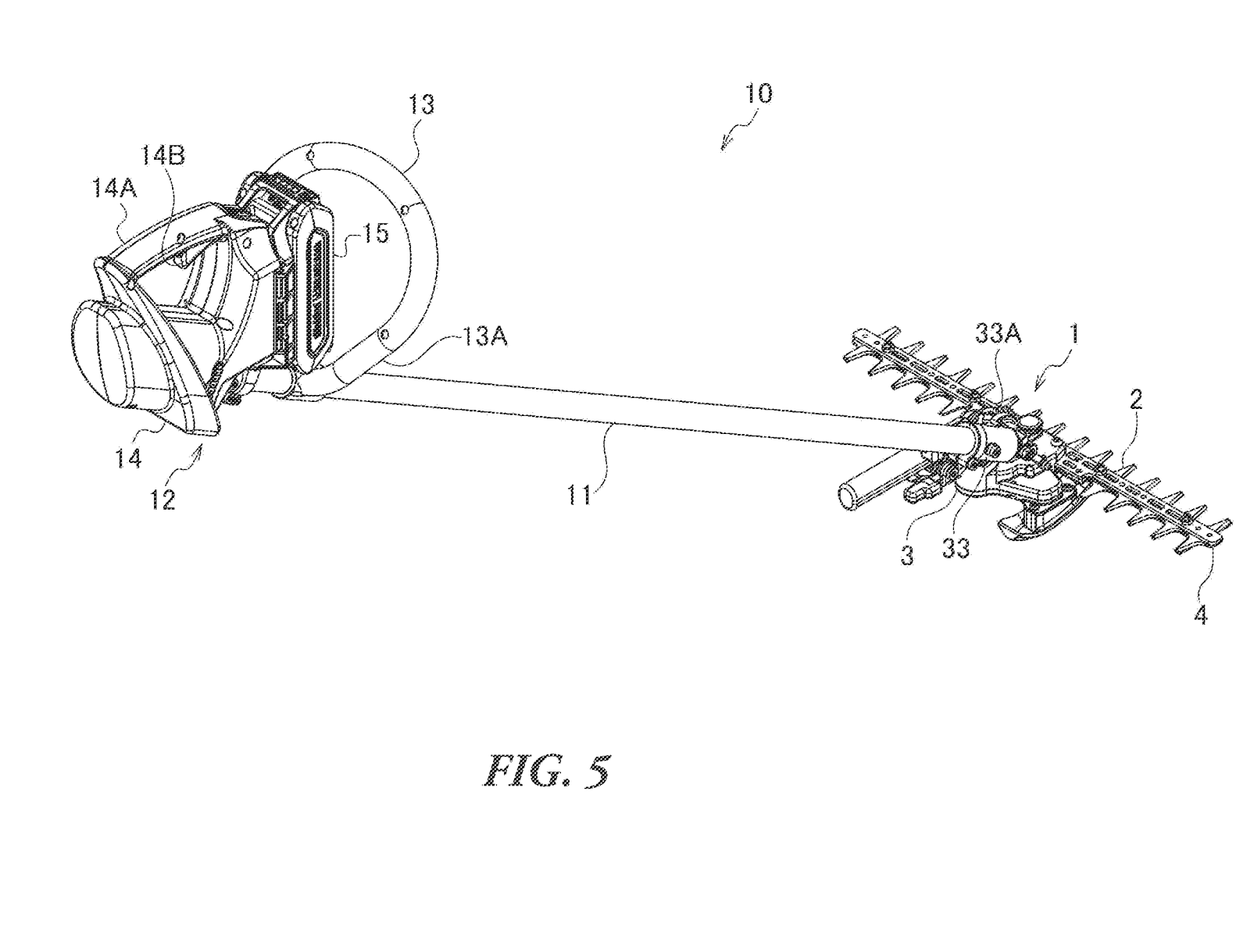
FIG. 5 illustrates a handheld working machine equipped with the reciprocating cutting blade apparatus.

FIG. 5 illustrates an example of handheld working machine equipped with the above-described reciprocating cutting blade apparatus 1. As illustrated, a handheld working machine 10 includes an operating rod 11, and the top end of the operating rod 11 is mounted to an operating rod mount 33 of the transmission case 3. The operating rod mount 33 is mounted to the transmission case 3 via an angle adjustment mechanism 33A. This angle adjustment mechanism 33A can adjust the rising angle of the operating rod 11 from the working surface of the cutting blades 2.

A drive shaft (not illustrated) configured to transmit a drive force to the above-described power train is provided in the operating rod 11. In addition, a drive unit 12 configured to drive the drive shaft is provided at the base end of the operating rod. 11, and an operating handle 13 is provided in the base end side of the operating rod 11. The operating handle 13 includes a grip 13A above the operating rod 11.

The drive unit 12 is configured to drive the reciprocating cutting blade apparatus 1 via the drive shaft in the operating rod 11, and includes a housing 14 to accommodate a motor disposed approximately coaxially with the operating rod 11. A rear candle 14A including an operating switch 14B configured to turn on and off the reciprocating cutting blade apparatus 1 is provided in the housing 14. A battery unit 15 configured to supply electric power to the motor in the housing 14 is externally attached to the housing 14.

This handheld working machine 10 is an electric brush cutter equipped with the reciprocating cutting blade apparatus 1. The longitudinal direction of the cutting blades 2 intersects the longitudinal direction of the operating rod 11, and therefore the reciprocating cutting blade apparatus 1 is provided at the top end of the operating rod 11 to form a T-shape. This handheld working machine 10 performs brush cutting by driving the reciprocating cutting blade apparatus 1 to move the reciprocating cutting blade apparatus 1 along the ground while the worker holds the operating handle 13 and the rear handle 14A of the housing 14 by the hands to keep a predetermined rising angle of the operating rod 11 from the ground.

With this handheld working machine 10, the width of the cutting blades 2 of the reciprocating cutting blade apparatus 1 in the longitudinal direction is the effective width without shaking the operating rod 11 from side to side. Accordingly, the worker can perform the brush cutting with the effective width by simply pushing the operating rod 11 forward. Therefore, it is possible to perform the brush cutting by the reciprocating cutting blade apparatus 1 speedily moving forward, and consequently to improve the efficiency of the brush cutting. Moreover, the reciprocating cutting blades are used to perform the brush cutting, and therefore it is possible to reduce the scattering substances during the work. By this means, it is possible to ensure the safety of the worker and the surrounding of the worker, and to perform the brush cutting without damaging other people's properties near the working site.

In addition, the handheld working machine 10 can suppress the vibration and the noise due to the reciprocation of the cutting blades 2, and therefore allow comfortable work, and avoid harmful effects due to the noise and so forth on the surrounding of the work site. Moreover, foreign substances and water are prevented from entering the transmission case 3, and therefore, when the cutting blades 2 approach the ground during the brush cutting, it is possible to ensure the durability of the cutting blades and the power train, and allow comfortable work with the cutting blades smoothly reciprocating. Furthermore, when the teeth 21 of the cutting blades 2 are provided on both the front and back sides, the handheld working machine 10 is pulled toward the worker, and therefore it is possible to easily handle leftover grass.

According to the invention, the reciprocating cutting blade apparatus can prevent foreign substances and water from entering the transmission case, smoothly reciprocate the cutting blades while improving the efficiency of the maintenance of the cutting blades, and prevent the coupling parts of the cutting blades and the power train from being worn out by effectively supplying the coupling parts with a lubricant.

As described above, the embodiments of the present invention have been described in detail with reference to the drawings. However, the specific configuration is not limited to the embodiments, and the design can be changed without departing from the scope of the present invention. In addition, the above-described embodiments can be combined by utilizing each other's technology as long as there is no particular contradiction or problem in the purpose and configuration.

The invention claimed is:

1. A reciprocating cutting blade apparatus comprising:
a pair of reciprocating cutting blades, each of the pair of reciprocating cutting blades extending longitudinally in a direction parallel to an X direction of a Cartesian coordinate system and having teeth extending in a Y direction, and each of the pair of reciprocating cutting blades disposed to overlap one another in a thickness direction parallel to a Z-axis of the Cartesian coordinate system;
a first support member and a second support member spaced apart from each other by a distance and configured to sandwich and reciprocably support the pair of reciprocating cutting blades; and
a transmission case to which the first support member and the second support member maintaining the distance therebetween are mounted,
the transmission case including:
a grease inlet and a first grease reservoir provided on first side of the first support member, the first grease reservoir being configured to accumulate grease poured from the grease inlet and;
a second grease reservoir provided on a second side of the second support member and configured to accumulate the grease poured from the grease inlet,
the first support member including a through-hole configured to communicate with the first grease reservoir,
the second support member including a through-hole configured to communicate with the second grease reservoir, and
the pair of reciprocating cutting blades including through-holes configured to allow communication between the through-hole of the first support member and the through-hole of the second support member, respectively.

2. The reciprocating cutting blade apparatus according to claim 1, wherein the second grease reservoir is provided on a packing contacting the second support member.

3. The reciprocating cutting blade apparatus according to claim 1, wherein the second grease reservoir is provided in a concave portion of the packing contacting the second support member.

4. The reciprocating cutting blade apparatus according to claim 1, wherein the transmission case includes a pair of reciprocating members engageable with the pair of reciprocating cutting blades and configured to transmit a reciprocating motion to the pair of reciprocating cutting blades, the pair of reciprocating members including through-holes configured to allow communication between the through-hole of the first support member and the through-hole of the second support member, respectively.

5. The reciprocating cutting blade apparatus according to claim 4, wherein:
each of the reciprocating cutting blades includes a concave portion with which a coupling part formed on a first end of a respective one of said reciprocating members is removably engaged; and
the through-holes of the reciprocating members are provided in the concave portion.

6. A handheld working machine equipped with the reciprocating cutting blade apparatus according to claim 1, the handheld working machine comprising:
an operating rod having a top end to which the transmission case is mounted;
wherein the longitudinal direction of the pair of reciprocating cutting blades intersects a longitudinal direction of the operating rod.

* * * * *